(12) United States Patent
Noh et al.

(10) Patent No.: US 10,333,202 B2
(45) Date of Patent: Jun. 25, 2019

(54) NFC ANTENNA MODULE AND PORTABLE TERMINAL HAVING THE SAME

(71) Applicant: AMOTECH CO., LTD., Incheon (KR)

(72) Inventors: Jin-Won Noh, Gwangju (KR); Se-Min Oh, Incheon (KR); Chi-Ho Lee, Incheon (KR); Hyung-Il Baek, Gyeonggi-do (KR); Beom-Jin Kim, Gyeonggi-do (KR)

(73) Assignee: Amotech Co., Ltd., Incheon (KR)

( * ) Notice: Subject to any disclaimer, the term of this patent is extended or adjusted under 35 U.S.C. 154(b) by 135 days.

(21) Appl. No.: 15/318,293

(22) PCT Filed: Jun. 12, 2015

(86) PCT No.: PCT/KR2015/005939
§ 371 (c)(1),
(2) Date: Dec. 12, 2016

(87) PCT Pub. No.: WO2015/190868
PCT Pub. Date: Dec. 17, 2015

(65) Prior Publication Data
US 2017/0133751 A1    May 11, 2017

(30) Foreign Application Priority Data
Jun. 13, 2014    (KR) .................. 10-2014-0072216

(51) Int. Cl.
*H01Q 1/27* (2006.01)
*G06K 7/10* (2006.01)
(Continued)

(52) U.S. Cl.
CPC .......... *H01Q 1/273* (2013.01); *G06K 7/10336* (2013.01); *H01Q 1/2291* (2013.01);
(Continued)

(58) Field of Classification Search
CPC .......... H01Q 1/38; H01Q 1/273; H01Q 1/526; H01Q 1/2291; H01B 5/0037
(Continued)

(56) References Cited

U.S. PATENT DOCUMENTS

| 9,627,762 B2 * | 4/2017 | Ito ............................. H01Q 1/38 |
| 2014/0035793 A1 * | 2/2014 | Kato ...................... H01Q 1/243 343/867 |
| 2015/0236418 A1 * | 8/2015 | Ito ............................. H01Q 7/06 343/788 |

FOREIGN PATENT DOCUMENTS

| JP | 2004-364199 A | 12/2004 |
| KR | 10-2006-0008332 A | 1/2006 |

(Continued)

*Primary Examiner* — Huedung X Mancuso
(74) *Attorney, Agent, or Firm* — Baker & Hostetler LLP

(57) ABSTRACT

Provided are an NFC antenna module and a portable terminal having the same, the NFC antenna module having a printed circuit board inserted in a radiation sheet thereof or a radiation field formed on the lower surface and at a side part of the portable terminal, thereby improving the antenna characteristics while solving the problem of mounting space shortage in a small-sized portable terminal. The provided NFC antenna module includes: a printed circuit board; a first radiation sheet, which has a first radiation pattern formed along the outer periphery of a central part and is connected to the printed circuit board; and an electromagnetic wave shielding sheet stacked on the printed circuit board and the first radiation sheet.

3 Claims, 13 Drawing Sheets

(51) Int. Cl.
*H01Q 1/22* (2006.01)
*H01Q 1/38* (2006.01)
*H01Q 1/52* (2006.01)
*H04B 5/00* (2006.01)

(52) U.S. Cl.
CPC ............... *H01Q 1/38* (2013.01); *H01Q 1/526* (2013.01); *H04B 5/0037* (2013.01); *H04B 5/0056* (2013.01); *H04B 5/0081* (2013.01)

(58) Field of Classification Search
USPC ........................................................ 343/702
See application file for complete search history.

(56) References Cited

FOREIGN PATENT DOCUMENTS

| KR | 10-2009-0126323 A | 12/2009 |
| KR | 10-1098263 B1 | 12/2011 |
| KR | 101177302 B1 | 8/2012 |
| KR | 10-2013-0045307 A | 5/2013 |
| KR | 10-2013-0113222 A | 10/2013 |
| KR | 101347271 B1 | 1/2014 |
| KR | 10-2014-0025143 A | 3/2014 |

\* cited by examiner

NFC ANTENNA MODULE AND PORTABLE TERMINAL HAVING THE SAME

TECHNICAL FIELD

The present invention relates generally to an NFC antenna module and a portable terminal having the same. More particularly, the present invention relates to an NFC antenna module provided in an electrical device mounted in a wearable terminal and performing communication, and to a portable terminal having the same.

Further, this application is a National Stage of International Application No. PCT/KR2015/005939, filed Jun. 12, 2015, which claims the benefit of Korean Patent Application No. 10-2014-0072216, filed Jun. 13, 2014, which are hereby incorporated by reference in their entirety into this application.

BACKGROUND ART

Along with the development of technology, the spread of portable terminals providing advanced services such as a DMB, wireless internet, near field communication between devices, etc. and basic services such as communication, playback audios or video files, navigation, etc. has become popular.

Since their creation the miniaturization of portable terminals has been sought in order to facilitate a user's holding and storing thereof. Recently however, a size of the display, which serves a main function of a multimedia device, has become lager since the use of multimedia services on such devices has increased, and thus a size of the portable terminal has also become larger.

Since portable terminals have become larger, the portable terminal is useful in using multimedia services, but the portable terminal is uncomfortable to hold, store, handle, etc. In other words, a user may find it difficult to keep the portable terminal in his or her pocket, and to operate the portable terminal with one hand.

Thus, a smart watch that is capable of using the basic services of the portable terminal by pairing therewith has been developed. The smart watch may include a camera, an accelerometer, a thermometer, an altimeter, a barometer, a compass, a chronograph, a calculator, a portable phone, a touch screen, a GPS, map display function, an information graphic, a computer speaker, a calendar, a watch, an SD card capacity recognition function, a battery charging function, etc.

The smart watch includes an NFC tag such that the smart watch is paired with the portable terminal. In other words, the smart watch performs Bluetooth pairing with the portable terminal through the NFC tag. Herein, the NFC tag is provided in a lower part of a body or in a charging battery of the smart watch since the smart watch is produced with metal materials and is produced in a small size.

However, when the NFC tag is provided in the lower part of the smart watch body, the portable terminal should be close to the lower part of the smart watch to be paired therewith since a radiation of the NFC tag is formed in the lower part of the body.

In addition, since the smart watch is produced in a small size, there is a limit on a size of an NFC antenna. Thus, the user has to take off the smart watch from his or her wrist to pair it with the portable terminal since a recognition distance is limited to about 1~2 cm.

In addition, since the smart watch includes an NFC tag due to a structural limitation, the user may find it difficult to use electronic payment applications.

DISCLOSURE

Technical Problem

The present invention has been made keeping in mind the above problems occurring in the related art, and an object of the present invention is to provide an NFC antenna module and a portable terminal having the same in which the antenna module is configured to improve antenna characteristics while solving a shortage of mounting space in a small portable terminal by inserting a printed circuit board into a radiation sheet or by forming a radiation field in a lower part and on both sides of the portable terminal.

Technical Solution

In order to accomplish the above object, the present invention provides a NFC antenna module mounted in a portable terminal, the module including: a printed circuit board; a first radiation sheet including a first radiation pattern formed along an outer peripheral portion of a central portion of the first radiation sheet, the first radiation sheet being connected to the printed circuit board; and an electromagnetic wave shielding sheet stacked on both the printed circuit board and the first radiation sheet.

The first radiation sheet may include at least one bending part that allows the first radiation sheet to be provided in a lower part and on one side of the portable terminal.

The first radiation sheet may provided on one side of the portable terminal by being bent at a side thereof that is in contact with the printed circuit board.

The antenna module may further include: a second radiation sheet connected to the printed circuit board that is connected to the first radiation sheet.

Herein, the second radiation sheet may include: a terminal connected to an internal circuit of the portable terminal; and a second radiation pattern connected to the terminal at an end part thereof. The second radiation sheet may include: at least one bending part that allows the second radiation sheet to be provided in a lower part and on one side of the portable terminal.

According to another aspect, there is provided a NFC antenna module including: a first radiation sheet including a first insertion hole and a first radiation pattern formed along an outer peripheral portion of the first insertion hole; a printed circuit board inserted into the first insertion hole; and an electromagnetic wave shielding sheet stacked on both the first radiation sheet and the printed circuit board. Herein, the antenna module may further include: a second radiation sheet including: a second insertion hole into which the first radiation sheet is inserted; and a wireless charging coil formed along an outer peripheral portion of the second insertion hole.

The printed circuit board may include: an amplification element connected to the first radiation sheet and amplifying a signal received from the first radiation pattern; and a signal processing element processes the signal amplified by the amplification element.

Advantageous Effects

According to the present invention, an NFC antenna module and a portable terminal having the same have an effect of minimizing height and size thereof since heights of a radiation pattern, an amplification element, and a signal processing element become identical by inserting a printed circuit board into the radiation sheet.

In addition, an NFC antenna module and a portable terminal having the same have an effect of increasing a recognition distance thereof by enlarging a radiation area while solving a shortage of mounting space in a small portable terminal by forming a radiation pattern in a radiation sheet into which a printed circuit board is inserted through a first insertion hole.

In addition, an NFC antenna module and a portable terminal having the same have an effect of cordlessly charging the portable terminal while solving a shortage of mounting space in a small portable terminal by forming a wireless charging coil in a radiation pattern onto which a printed circuit board and a first radiation sheet are inserted through a second insertion hole.

In addition, an NFC antenna module and a portable terminal having the same have an effect of communicating (or pairing) with another terminal by forming a radiation field in a lower part and on both sides thereof although a user wears the portable terminal.

In addition, an NFC antenna module and a portable terminal having the same have an effect of increasing a recognition distance thereof while solving a shortage of mounting space in a small portable terminal by forming a bending part so the NFC antenna module is provided in a lower part and on one side of the portable terminal.

In addition, an NFC antenna module and a portable terminal having the same have an effect of solving a shortage of mounting space in a small portable terminal by integrally forming a first radiation sheet and a second radiation sheet that resonate at different bandwidths.

MODE FOR INVENTION

Figure 1:
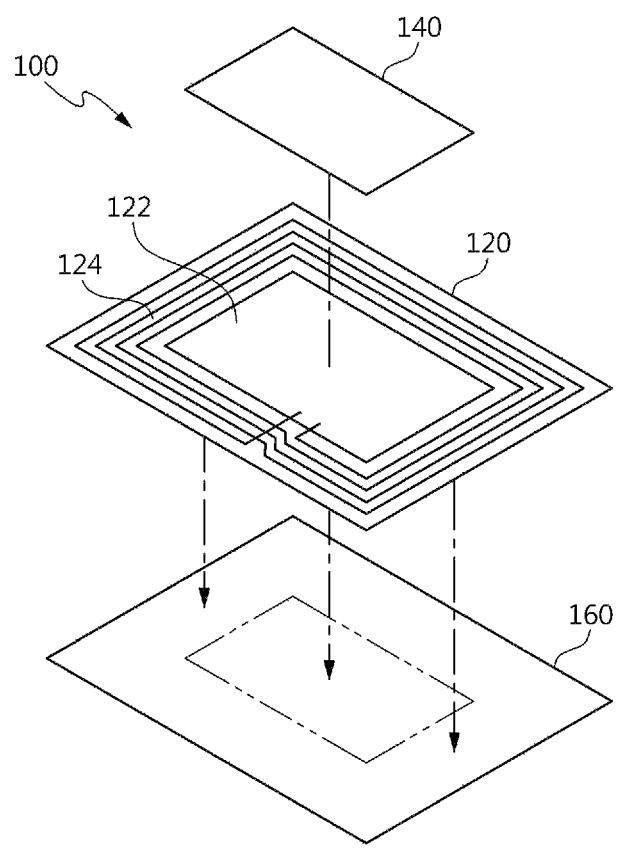
FIGS. 1 to 4 are views showing an NFC antenna module according to a first embodiment of the present invention.

Exemplary embodiments of the present invention will be described below with reference to the accompanying drawings in order for those skilled in the art to be able to easily implement the technical spirit of the present invention. First, in the specification, in adding reference numerals to components throughout the drawings, it should be noted that like reference numerals designate like components even though components are shown in different drawings. In describing the present invention, well-known functions or constructions will not be described in detail since they may unnecessarily obscure the understanding of the present invention.

FIGS. 1 to 4 are views showing an NFC antenna module according to a first embodiment of the present invention. The NFC antenna module 100 is included in a wearable terminal such as a smart watch that is produced in a small size to fit on a body, and in a portable terminal such a smartphone, etc. For this, as shown in FIG. 1, the NFC antenna module 100 includes a printed circuit board 140, a first radiation sheet 120, and an electromagnetic wave shielding sheet 160.

The first radiation sheet 120 is configured with a flexible printed circuit board (FPCB) and includes a first insertion hole 122 into which the printed circuit board 140 is inserted. In other words, the first radiation sheet 120 includes the first insertion hole 122 therethrough that has the same size as or larger than the printed circuit board 140. Herein, the first insertion hole 122 is formed to have the same shape as the printed circuit board 140 (for example, square, rectangle, polygon, etc.)

The first radiation sheet 120 includes a first radiation pattern 124 on one surface thereof and the first radiation pattern 124 resonates at a NFC frequency bandwidth. In other words, the first radiation pattern 124 is formed along an outer peripheral portion of the first insertion hole 122 and has a loop form whereby a wire is coiled multiple times. Both ends of the first radiation pattern 124 are connected to the printed circuit board 140.

Figure 2:
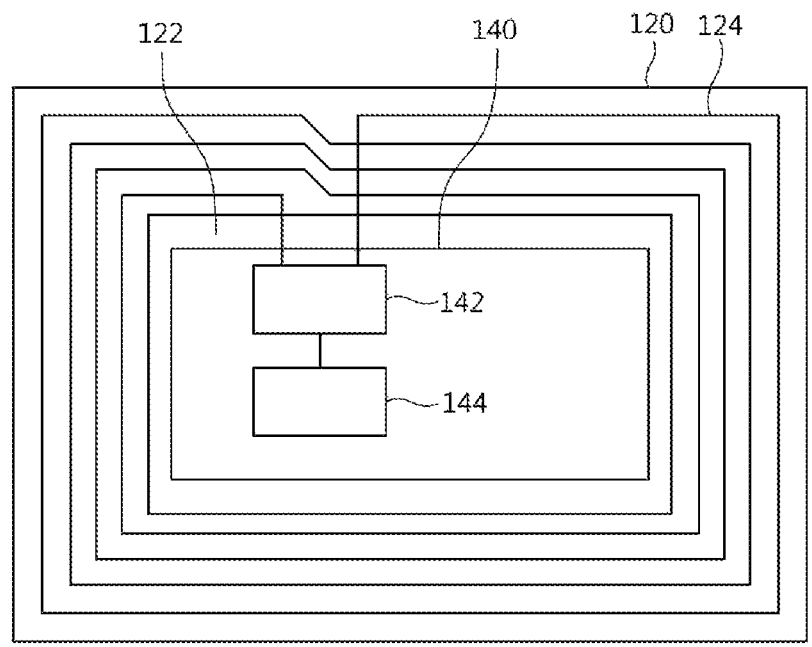

The printed circuit board 140 is inserted into the first insertion hole 122 formed in the first radiation sheet 120. Herein, as shown in FIG. 2, the printed circuit board 140 includes an amplification element 142 and a signal processing element 144 on one surface thereof. Herein, the amplification element 142 is connected to both ends of the first radiation pattern 124 and amplifies a signal received from the first radiation pattern 124 and transmits the amplified signal to the signal processing element 144. The signal processing element 144 processes the amplified signal and transmits to an internal circuit of a portable terminal. In addition, the signal processing element 144 transmits a signal that is received from the internal circuit of the portable terminal to the amplification element 142, and the amplification element 142 amplifies the signal received from the signal processing element 144 and radiates the amplified signal through the first radiation pattern 124.

The electromagnetic wave shielding sheet 160 is configured with an anti-electromagnetic wave sheet such as a ferrite sheet, and is stacked on both the first radiation sheet 120 and the printed circuit board 140. In other words, the electromagnetic wave shielding sheet 160 is stacked on the first radiation sheet 120 and a part of the printed circuit board 140 that is exposed through the first insertion hole 122.

Figure 3:
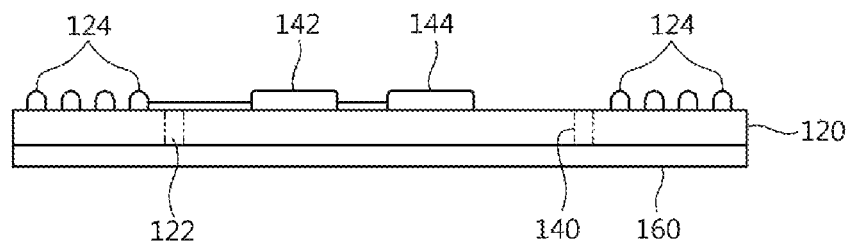

As shown in FIG. 3, in the NFC antenna module 100, the printed circuit board 140 is inserted into the first radiation sheet 120 and thus heights of the radiation sheet 120, the amplification element 142, and the signal processing element 144 may become identical. Therefore, the NFC antenna module 100 has an effect of minimizing height and size thereof by forming a radiation pattern in the first radiation sheet 120 into which the printed circuit board 140 is inserted through the first insertion hole 122.

In addition, the NFC antenna module 100 has an effect of increasing a recognition distance thereof by enlarging a radiation area while solving a shortage of mounting space in a small portable terminal by forming a radiation pattern in the first radiation sheet 120 into which the printed circuit board 140 is inserted through the first insertion hole 122.

Figure 4:
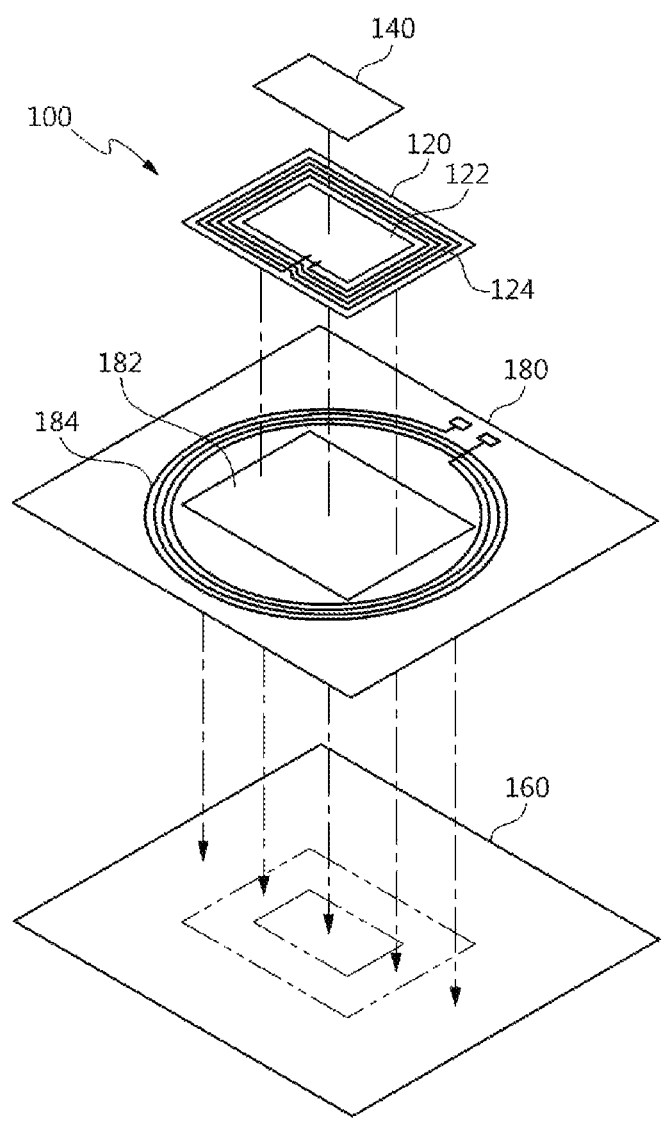

However, as shown in FIG. 4, the NFC antenna module 100 may further include a second radiation sheet 180. The second radiation sheet 180 includes a second insertion hole 182 into which the first radiation sheet 120 is inserted, and the second radiation sheet 180 is formed to have a loop form whereby a wireless charging coil 184 is coiled along an outer peripheral portion of the second insertion hole 182. Herein, the electromagnetic wave shielding sheet 160 is stacked on the first radiation sheet 120, a part of the printed circuit board 140, and the second radiation sheet 180, and blocks electromagnetic wave interference with the internal circuit of the portable terminal.

Therefore, the NFC antenna module 100 has an effect of wirelessly charging the portable terminal while solving the shortage of mounting space in a small portable terminal by forming the wireless charging coil 184 in the second radiation sheet 180 into which the printed circuit board 140 and the first radiation sheet 120 is inserted through the second insertion hole 182.

Figure 5:
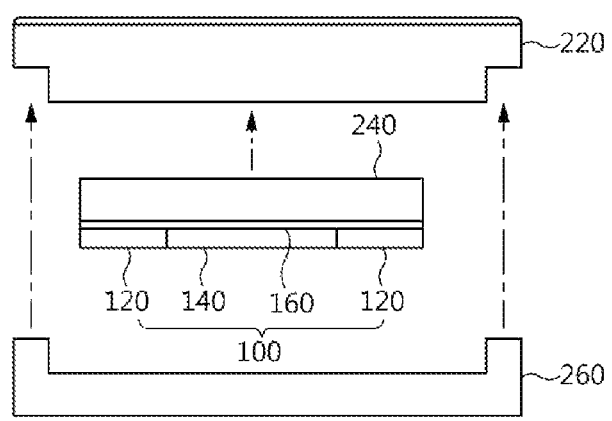
FIG. 5 is a portable terminal including the NFC antenna module according to the first embodiment of the present invention.

FIG. 5 is a portable terminal including the NFC antenna module according to the first embodiment of the present invention. As shown in FIG. 5, the portable terminal includes: a portable terminal body 220 in which both a display and a circuit board having an internal circuit are mounted; a battery pack 240 inserted into a predetermined area defined in a lower part of the portable terminal body 220; the NFC antenna module 100; and a lower housing 260 mounted to the lower part of the portable terminal body 220 having the battery pack 240 and the NFC antenna module 100 disposed therebetween.

Herein, the NFC antenna module 100 is provided on one surface (in other words, in a direction facing to the lower housing 260) of the battery pack 140. The electromagnetic wave shielding sheet 160 of the NFC antenna module 100 is provided in a direction facing to the portable terminal body 220 and blocks electromagnetic wave interference with the internal circuit of the portable terminal.

Thus, the portable terminal including the NFC antenna module 100 is capable of communicating (or pairing) with another terminal by forming a radiation field in a lower part and on one side of the portable terminal although a user wears the portable terminal.

Figure 6:
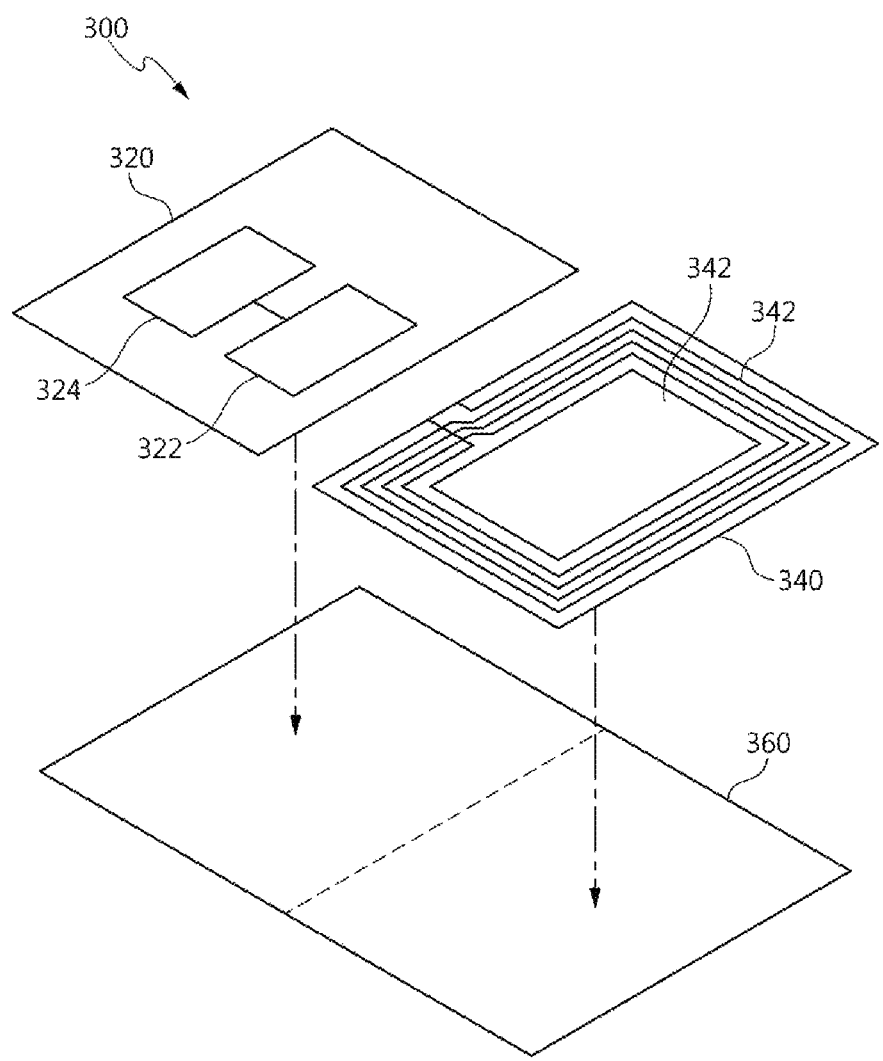
FIGS. 6 to 10 are views showing an NFC antenna module according to a second embodiment of the present invention.

FIGS. 6 to 10 are views showing an NFC antenna module according to a second embodiment of the present invention. As shown in FIG. 6, the NFC antenna module 300 is configured with a printed circuit board 320, a first radiation sheet 340, and an electromagnetic wave shielding sheet 360.

The printed circuit board 320 includes an amplification element 322 connected to both ends of a first radiation pattern 344 that is formed on the first radiation sheet 340, and a signal processing element 324. The amplification element 322 and the signal processing element 324 are formed on one surface of the printed circuit board 320. Herein, the amplification element 322 is connected to both ends of the first radiation pattern 344 and amplifies a signal received from the first radiation pattern 344 and transmits the amplified signal to the signal processing element 324. The signal processing element 344 processes the amplified signal and transmits the processed signal to an internal circuit of a portable terminal. In addition, the signal processing element 344 transmits a signal that is received from the internal circuit of the portable terminal to the amplification element 322, and the amplification element 322 amplifies the signal received from the signal processing element 324 and radiates the amplified signal through the first radiation pattern 344.

The first radiation sheet 340 is configured with a flexible printed circuit board (FPCB) and is connected to one side of the printed circuit board 320. The first radiation pattern 344 is formed on one surface of the first radiation sheet 340 and the first radiation pattern 344 resonates at an NFC frequency bandwidth. Herein, the first radiation sheet 340 includes a central part 342 on which a radiation pattern is not formed. The first radiation pattern 344 is formed along an outer peripheral portion of the central part 342, and is formed to have a loop form in which a wire is coiled multiple times. Herein, both ends of the first radiation pattern 344 are connected to the printed circuit board 320.

Figure 7:
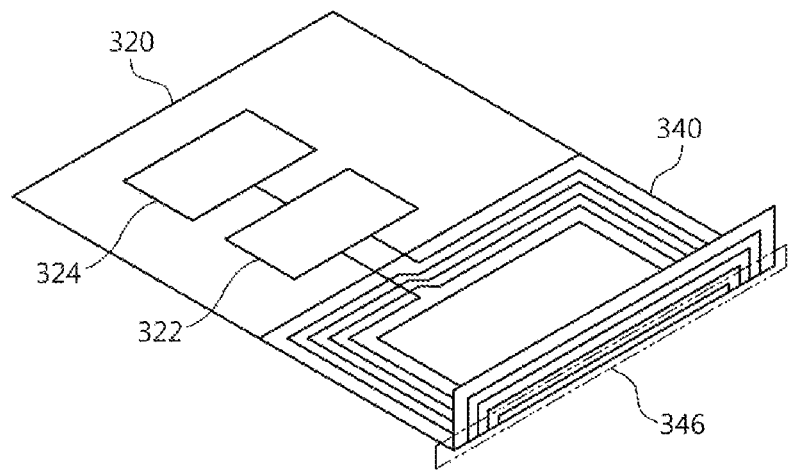
Figure 8:
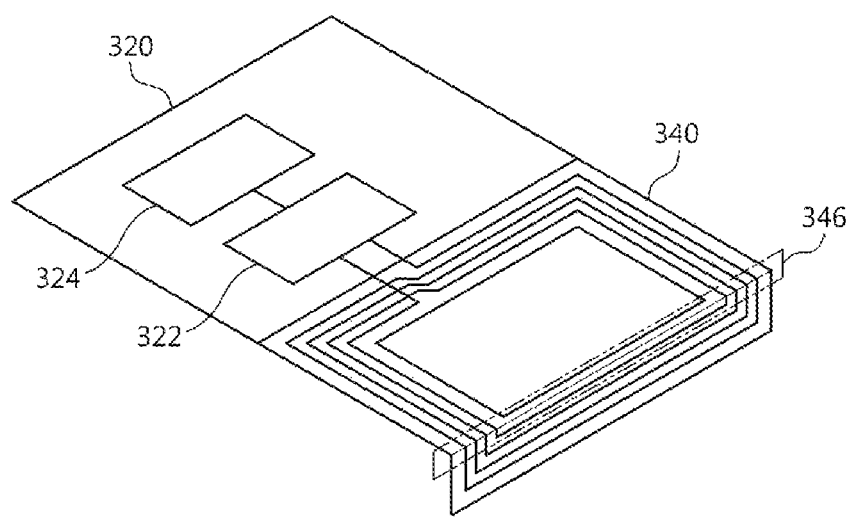

The first radiation sheet 340 includes at least one bending part 346 that allows the first radiation sheet 340 to be provided in a lower part and on one side of a portable terminal. In other words, as shown in FIG. 7, one side of the first radiation sheet 340 is upwardly bent around a bending part 346 so the first radiation sheet 340 is provided between a battery pack and a lower housing to form a radiation field in a lower part and on one side of a portable terminal. Alternatively, as shown in FIG. 8, one side of the first radiation sheet 340 is downwardly bent around the bending part 346 so the first radiation sheet 340 is provided between the battery pack and a portable terminal body to form a radiation field in a lower part and on one side of the portable terminal.

Figure 9:
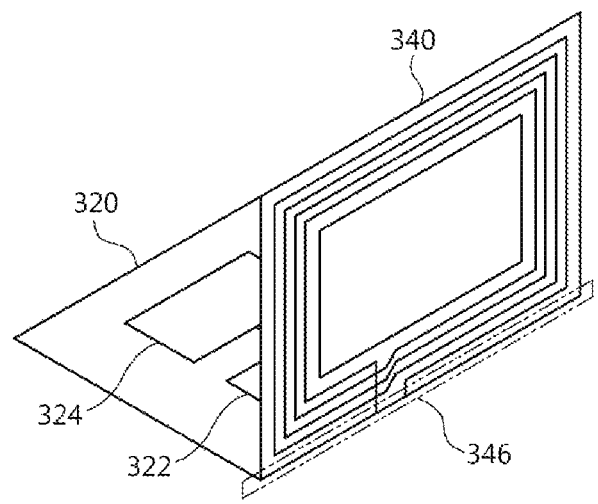
Figure 10:
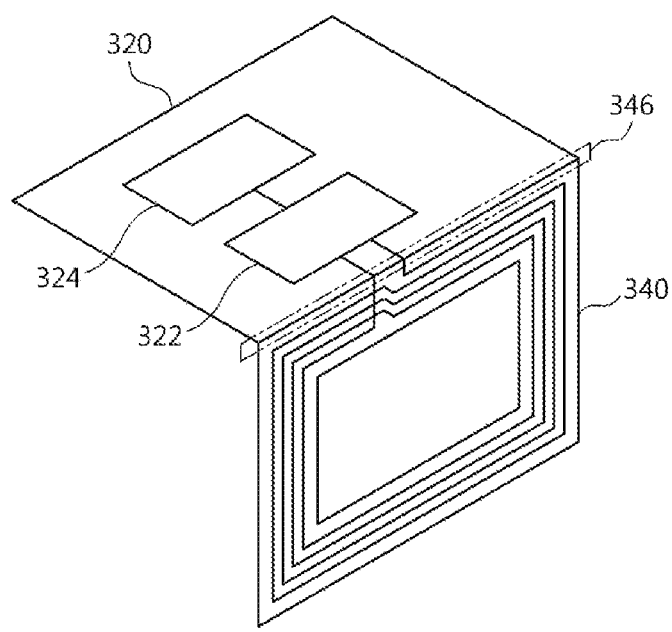

The first radiation sheet 340 may be provided on one side of the portable terminal by upwardly or downwardly bending a side thereof that is in contact with the printed circuit board 320. In other words, as shown in FIG. 9, one side of the first radiation sheet 340 that is in contact with the printed circuit board 320 is upwardly bent so the first radiation sheet 340 is provided between the battery pack and the lower housing to form a radiation field on one side of the portable terminal. Alternatively, as shown in FIG. 10, one side of the first radiation sheet 340 that is in contact with the printed circuit board 320 is downwardly bent so the first radiation sheet 340 is provided between the battery pack and the portable terminal body to form a radiation field on one side of the portable terminal.

The electromagnetic wave shielding sheet 360 is configured with an anti-electromagnetic wave sheet such as a ferrite sheet, and is stacked on both the first radiation sheet 340 and the printed circuit board 320. Herein, the electromagnetic wave shielding sheet 360 is bent at a position in which the bending part 346 of the first radiation sheet 340 is formed.

Thus, the NFC antenna module 300 has an effect of increasing a recognition distance thereof by enlarging a radiation area while solving a shortage of mounting space in a small portable terminal by forming the bending part 346 so the NFC antenna module 300 is provided in a lower part and on one side of a portable terminal.

Figure 11:
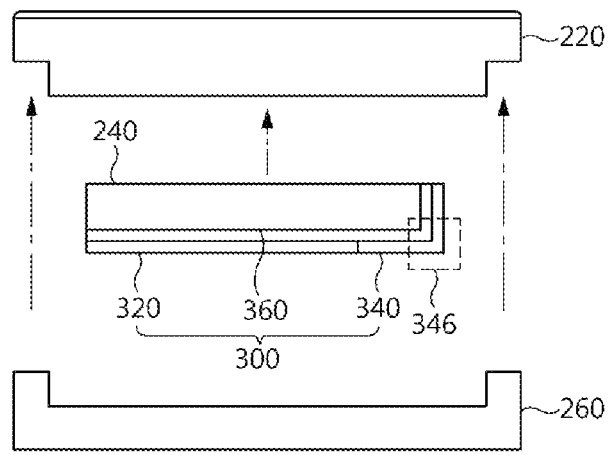
FIGS. 11 to 14 are views showing portable terminals including the NFC antenna module according to the second embodiment of the present invention.

FIGS. 11 to 14 are views showing portable terminals including the NFC antenna module according to the second embodiment of the present invention. As shown in FIG. 11, the portable terminal including the NFC antenna module 300 according to the second embodiment includes: a portable terminal body 220 in which both a display and a circuit board having an internal circuit are mounted; a battery pack 240 inserted into a predetermined area defined in a lower part of the portable terminal body 220; the NFC antenna module 300 including the bending part 346; and a lower housing 260 mounted to the lower part of the portable terminal body 220 having the battery pack 240 and the NFC antenna module 100 disposed therebetween.

Figure 12:
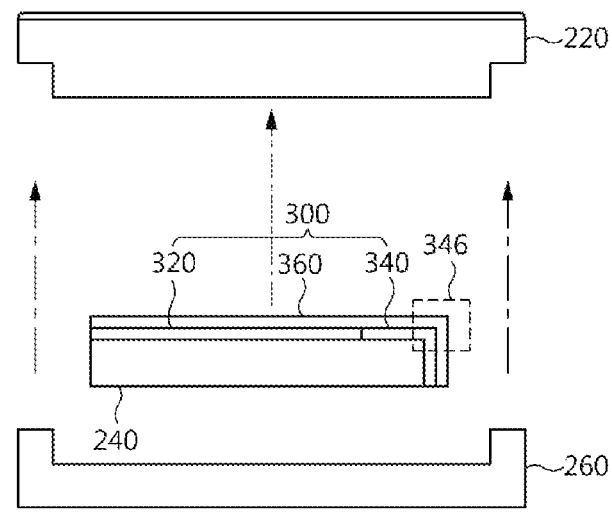

Herein, one side of the NFC antenna module 300 is upwardly bent around the bending part 346 so the NFC antenna module 300 is provided between the battery pack 240 and the lower housing 260. Alternatively, as shown in FIG. 12, one side of the NFC antenna module 300 is downwardly bent around the bending part 346 so the NFC antenna module 300 is provided between the battery pack 240 and the portable terminal body 220. Accordingly, the NFC antenna module 300 forms a radiation field in the lower part and on one side of the portable terminal.

Figure 13:
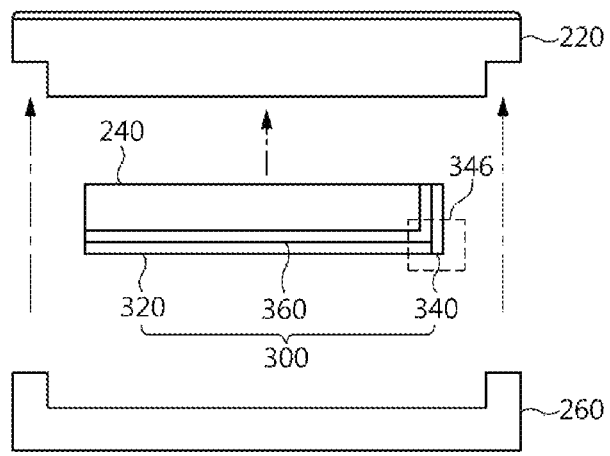
Figure 14:
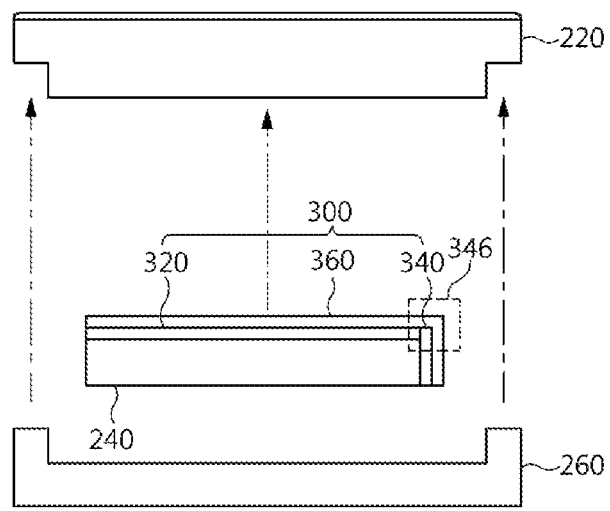

However, as shown in FIG. 13, a part of the NFC antenna module 300 that is in contact with the printed circuit board 320 may be upwardly bent so the NFC antenna module 300 is provided between the battery pack 240 and the lower housing 260. Alternatively, as shown in FIG. 14, the part of the NFC antenna module 300 that is in contact with the printed circuit board 320 may be downwardly bent so the NFC antenna module 300 is provided between the battery pack 240 and the portable terminal body 220. Accordingly, the NFC antenna module 300 forms a radiation field in the lower part and on one side of the portable terminal.

Thus, the portable terminal including the NFC antenna module 300 has an effect of increasing a recognition distance thereof by enlarging a radiation area while solving a shortage of mounting space in a small portable terminal by forming the bending part 346 so the NFC antenna module 300 is provided in a lower part and on one side of the portable terminal.

In addition, the portable terminal including the NFC antenna module 300 is capable of communicating (or pairing) with another terminal by forming a radiation field in a lower part and on one side thereof although a user wears the portable terminal.

Figure 15:
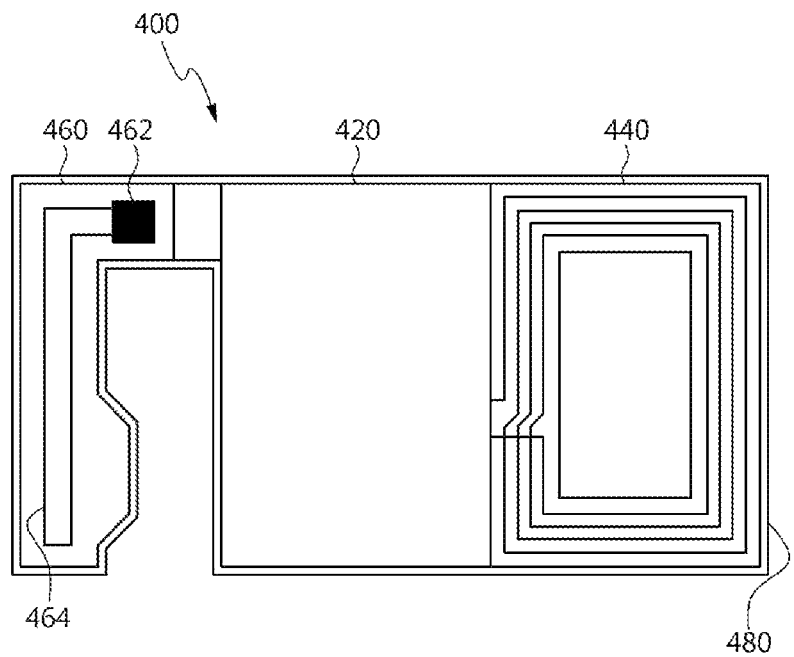
FIG. 15 is a view showing an NFC antenna module according to a third embodiment of the present invention.

FIG. 15 is a view showing an NFC antenna module according to a third embodiment of the present invention. As shown in FIG. 15, the NFC antenna module 400 is configured with a printed circuit board 420, a first radiation sheet 440, a second radiation sheet 460, and an electromagnetic wave shielding sheet 480. Herein, the printed circuit board 420 and the first radiation sheet 440 are the same as the printed circuit board 320 and the first radiation sheet 340 of the NFC antenna module 300 of the second embodiment, and thus detailed descriptions thereof are omitted.

The second radiation sheet 460 is connected to one side of the printed circuit board 420. In other words, the second radiation sheet 460 is connected to one side of the printed circuit board 420 that is the opposite side of the circuit board 420 connected to the first radiation sheet 440. The second radiation sheet 460 includes a terminal 462 connected to an internal circuit of a portable terminal and a second radiation pattern 464 connected to the terminal 4620 at an end part thereof and having a polygonal shape. Herein, the second radiation pattern 464 resonates a signal at a Bluetooth bandwidth.

The second radiation sheet 460 includes at least one bending part 466 that allows the radiation sheet 460 to be provided in a lower part and on one side of a portable terminal. In other words, one side of the second radiation sheet 460 is upwardly or downwardly bent around the bending part 466. The second radiation sheet 460 is provided between the battery pack 240 and the lower housing 260, or between the portable terminal body 220 and the battery pack 240 to form a radiation field in the lower part and on one side of the portable terminal.

The electromagnetic wave shielding sheet 480 is configured with an anti-electromagnetic wave sheet such as a ferrite sheet, and stacked on the first radiation sheet 440, the second radiation sheet 460, and the printed circuit board 420. Herein, the electromagnetic wave shielding sheet 480 is bent at positions in which the bending parts 466 of the first radiation sheet 440 and the second radiation sheet 460 are formed.

Thus, the NFC antenna module 400 has an effect of increasing a recognition distance thereof by enlarging a radiation area while solving a shortage of mounting space in a small portable terminal by forming the bending parts 466 so the NFC antenna module 400 is provided in a lower part and on one side of a portable terminal.

In addition, the NFC antenna module 400 has an effect of solving a shortage of mounting space in a small portable terminal by integrally forming the first radiation sheet 440 and the second radiation sheet 460 that resonate at different frequency bandwidths.

Figure 16:
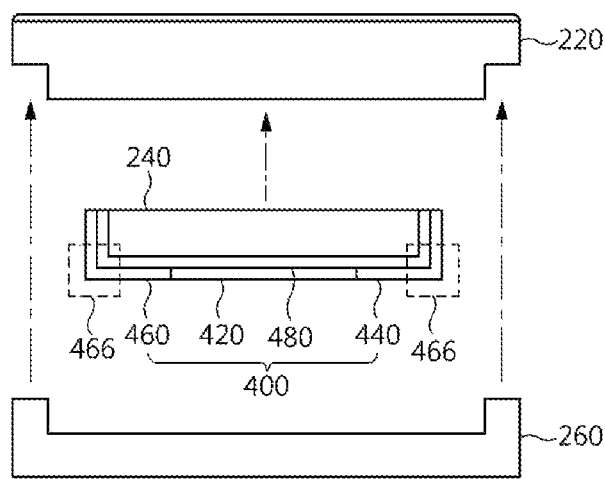
FIGS. 16 to 19 are views showing portable terminals including the NFC antenna module according to the third embodiment of the present invention.

FIGS. 16 to 19 are views showing portable terminals including the NFC antenna module according to the third embodiment of the present invention. As shown in FIG. 16, the portable terminal including the NFC antenna module 400 according to the third embodiment includes: a portable terminal body 220 in which both a display and a circuit board with an internal circuit formed therein are mounted, a battery pack 240 inserted into a predetermined area defined in a lower part of the portable terminal body 220; the NFC antenna module 400 including the bending part 466; and a lower housing 260 mounted to the lower part of the portable terminal body 220 having the battery pack 240 and the NFC antenna module 400 disposed therebetween.

Figure 17:
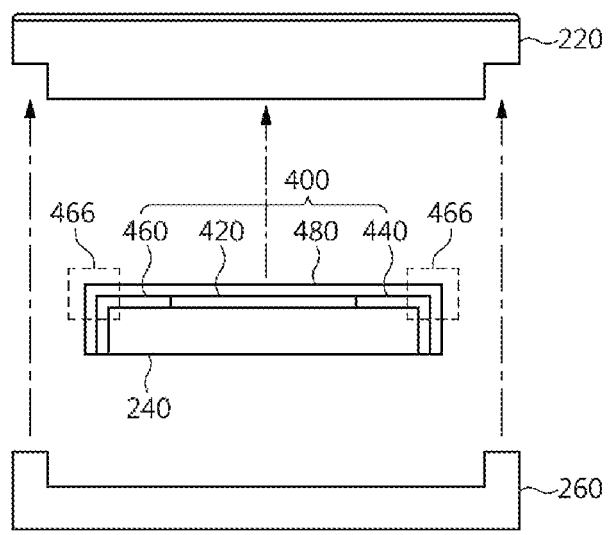

Herein, both sides of the NFC antenna module 400 may be upwardly bent around the two bending parts 466 to the NFC antenna module 400 may be provided between the battery pack 240 and the lower housing 260. Alternatively, as shown in FIG. 17, both sides of the NFC antenna module 400 may be downwardly bent around the two bending parts 466 to the NFC antenna module 400 may be provided between the battery pack 240 and the portable terminal body 220.

Figure 18:
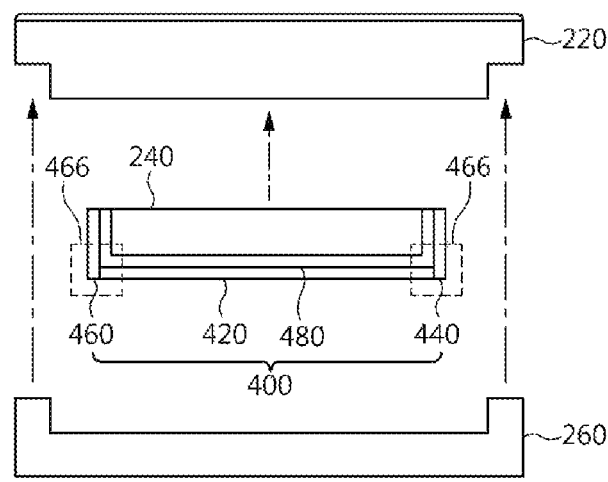
Figure 19:
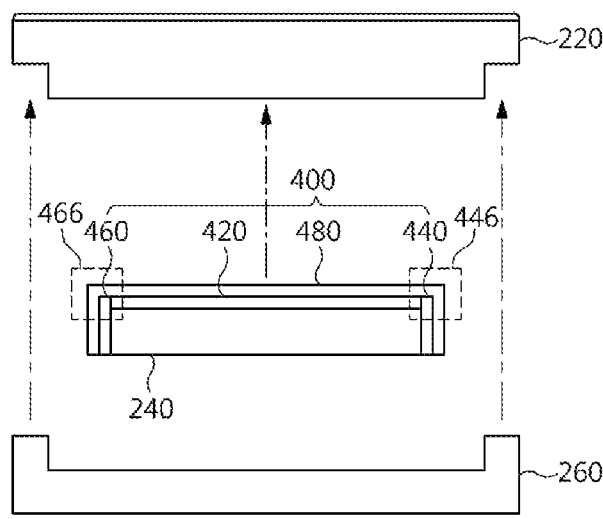

However, as shown in FIG. 18, one side (that is, a portion at which the first radiation sheet 440 and the printed circuit board 420 are in contact with each other) of the NFC antenna module 400 may be upwardly bent and the another side (that is, a portion at which the second radiation sheet 440 and the printed circuit board 420 are in contact with each other) of the NFC antenna module 400 may be upwardly bent so the NFC antenna module 400 may be provided between the battery pack 240 and the lower housing 260. Alternatively, as shown in FIG. 19, one side (that is, a portion at which the first radiation sheet 440 and the printed circuit board 420 are in contact with each other) of the NFC antenna module 400 may be downwardly bent and the another side (that is, a portion at which the second radiation sheet 440 and the printed circuit board 420 are in contact with each other) of the NFC antenna module 400 may be downwardly bent so the NFC antenna module 400 may be provided between the battery pack 240 and the portable terminal body 220.

The portable terminal forms a radiation field in a lower part and on both sides thereof by providing the NFC antenna module 400 between the battery pack 240 and the lower housing 260 or between the portable terminal body 220 and the battery pack 240. Herein, a radiation field of an NFC frequency bandwidth is formed in the lower part and on one side of the portable terminal and a radiation field of a Bluetooth bandwidth is formed in the lower part and in the another side of the portable terminal.

Thus, the portable terminal including the NFC antenna module 400 has an effect of increasing a recognition distance thereof by enlarging a radiation area while solving a shortage of mounting space in a small portable terminal by forming the bending parts 466 in the NFC antenna module 400 so the NFC antenna module 400 is provided in a lower part and on one side of the portable terminal.

In addition, the portable terminal including the NFC antenna module 400 is capable of communicating (or pairing) with another terminal by forming a radiation field in a lower part and on both sides thereof although a user wears the portable terminal.

Figure 20:
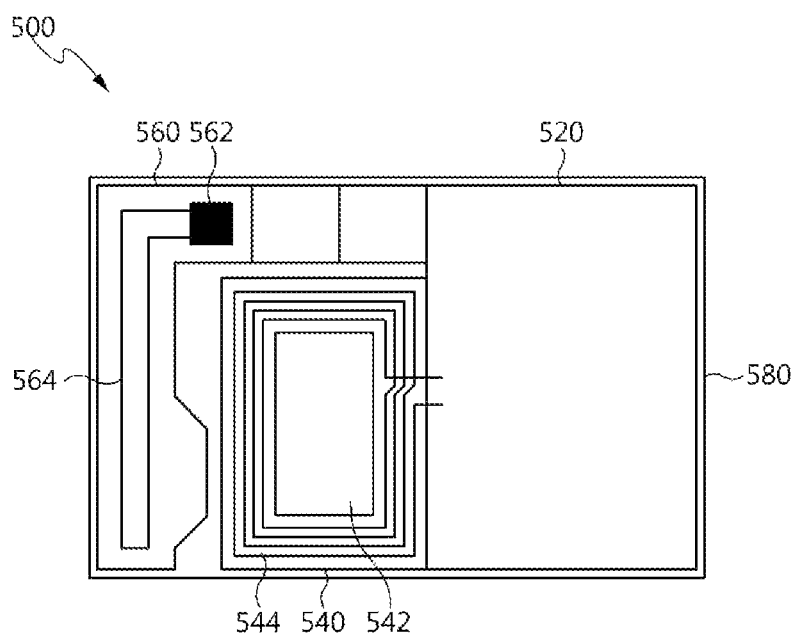
FIG. 20 a view showing an NFC antenna module according to a fourth embodiment of the present invention.

FIG. 20 a view showing an NFC antenna module according to a fourth embodiment of the present invention. As shown in FIG. 20, the NFC antenna module 500 is configured with a printed circuit board 520, a first radiation sheet 540, a second radiation sheet 560, and an electromagnetic wave shielding sheet 580. Herein, the printed circuit board 520 is the same as the printed circuit board 320 of the NFC antenna module 300 of the second embodiment, and thus a detailed description thereof is omitted.

The first radiation sheet 540 is configured with a flexible printed circuit board (FPCB) and is connected to one side of the printed circuit board 520. The first radiation sheet 540 includes a first radiation pattern 544 that resonates at an NFC frequency bandwidth on one surface thereof. Herein, the first radiation sheet 540 includes a central part 542 on which a radiation pattern is not formed. The first radiation pattern 544 is formed along an outer peripheral portion of the central part 542, and is formed to have a loop form in which a wire is coiled multiple times. Herein, both ends of the first radiation pattern 544 are connected to the printed circuit board 520.

The first radiation sheet 540 includes at least one bending part that allows the first radiation sheet 540 to be provided in a lower part and on one side of a portable terminal. In other words, one side of the first radiation sheet 540 is upwardly bent around a bending part so the first radiation sheet 540 is provided between the battery pack 240 and the lower housing 260, and thus a radiation field is formed in a lower part and on one side of the portable terminal. Alternatively, one side of the first radiation sheet 540 may be downwardly bent around a bending part so the first radiation sheet 540 is provided between the battery pack 240 and the portable terminal body 220, and thus a radiation field may be formed in the lower part and on one side of the portable terminal.

The first radiation sheet 540 may be provided on one side of the portable terminal by upwardly or downwardly bending a side thereof that is in contact with the printed circuit board 520. In other words, one side of the first radiation sheet 540 that is in contact with the printed circuit board 520 is upwardly bent so the first radiation sheet 540 is provided between the battery pack and the lower housing, and thus a radiation field is formed on one side of the portable terminal. Alternatively, one side of the first radiation sheet 540 that is in contact with the printed circuit board 520 may be downwardly bent so the first radiation sheet 540 is provided between the battery pack 240 and the portable terminal body 220, and thus a radiation field may be formed on one side of the portable terminal.

The second radiation sheet 560 is connected to one side of the printed circuit board 520. In other words, the second radiation sheet 560 is connected to one side of the printed circuit board 520 that is connected to the first radiation sheet 540. Herein, the second radiation pattern 560 is connected to the printed circuit board 520 by being spaced apart from the first radiation sheet 540 by a predetermined distance.

The second radiation sheet 560 includes a terminal 562 that is connected to an internal circuit of a portable terminal and a second radiation pattern 564 formed in a polygonal shape and connected to the terminal 562 on one surface thereof. Herein, the second radiation pattern 564 resonates a signal at Bluetooth bandwidth.

The second radiation sheet 560 includes at least one bending part that allows the second radiation pattern 560 to be provided in a lower part and on one side of the portable terminal. In other words, one side of the second radiation sheet 560 is upwardly or downwardly bent around the bending part. The second radiation sheet 560 is provided between the battery pack 240 and the lower housing 260, or between the portable terminal body 220 and the battery pack 240 to form a radiation field in the lower part and on one side of the portable terminal.

The electromagnetic wave shielding sheet 580 is configured with an anti-electromagnetic wave sheet such as a ferrite sheet, and is stacked on the first radiation sheet 540, the second radiation sheet 560, and the electromagnetic wave shielding sheet 580. Herein, the electromagnetic wave shielding sheet 580 is bent at positions in which the bending parts of the first radiation sheet 540 and the second radiation sheet 560 are formed.

Thus, the NFC antenna module 500 has an effect of increasing a recognition distance thereof by enlarging a radiation area while solving a shortage of mounting space in a small portable terminal by forming the bending part so the NFC antenna module 500 is provided in a lower part and on one side of a portable terminal.

In addition, the NFC antenna module 500 has an effect of solving a shortage of mounting space in a small portable terminal by integrally forming the first radiation sheet 540 and the second radiation sheet 560 that resonate at different frequency bandwidths.

Figure 21:
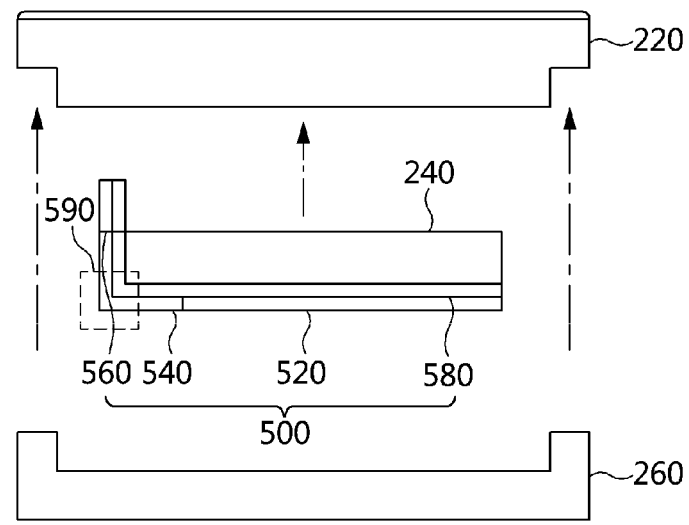
FIGS. 21 and 22 are views showing portable terminals including the NFC antenna module according to the fourth embodiment of the present invention.
Figure 22:
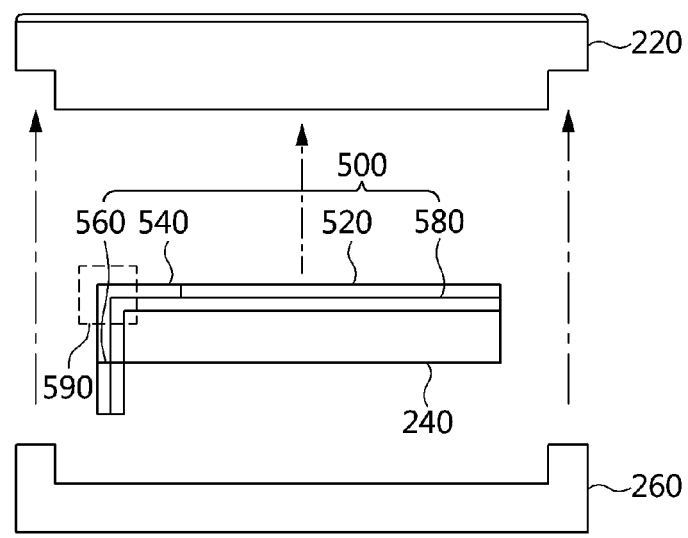

FIGS. 21 and 22 are views showing portable terminals including the NFC antenna module according to the fourth embodiment of the present invention. As shown in FIG. 21, the portable terminal including the NFC antenna module 500 according to the fourth embodiment includes: a portable terminal body 220 in which both a display and a circuit board with an internal circuit formed therein are mounted; a battery pack 240 inserted into a predetermined area defined in a lower part of the portable terminal body 220; the NFC antenna module 500 including the bending part 590; and a lower housing 260 mounted to the lower part of the portable terminal body 220 having the battery pack 240 and the NFC antenna module 400 disposed therebetween.

Herein, one side of the first radiation sheet 540 and the second radiation sheet 560 is upwardly bent around the bending part 590 so the NFC antenna module 500 is provided between the battery pack 240 and the lower housing 260. Alternatively, as shown in FIG. 22, one side of the first radiation sheet 540 and the second radiation sheet 560 is downwardly bent around the bending part 590 so the NFC antenna module 500 is provided between the battery pack 240 and the portable terminal body 220.

Accordingly, the portable terminal forms a radiation field in a lower part and on both sides of the portable terminal. Herein, a radiation field of an NFC frequency bandwidth is formed in the lower part and on one side of the portable terminal and a radiation field of a Bluetooth bandwidth is formed in the lower part and on the other side of the portable terminal.

Therefore, the portable terminal including the NFC antenna module 500 has an effect of increasing a recognition distance thereof by enlarging a radiation area while solving a shortage of mounting space in a small portable terminal by forming the bending part in the NFC antenna module 500 so the NFC antenna module 500 is provided in a lower part and on one side of a portable terminal.

In addition, the portable terminal including the NFC antenna module 500 is capable of communicating (or pairing) with another terminal by forming a radiation field in a lower part and on one side thereof although a user wears the portable terminal.

While the exemplary embodiments of the present invention have been described, the present invention is not limited by the specific embodiments. Those skilled in the art will appreciate that the various changes and modifications may be made to the present invention without departing from the spirit and scope of the invention as set forth in the appended claims.

The invention claimed is:

1. A portable terminal, comprising:
   a portable terminal body;
   a lower housing mounted to a lower surface of the portable terminal body;
   an NFC antenna module disposed between the portable terminal body and the lower housing; and
   a battery pack disposed between the portable terminal body and the lower housing,
   wherein the NFC antenna module comprises:
   a printed circuit board disposed on a top or a bottom surface of the battery pack; and
   a first radiation sheet including a first radiation pattern formed along an outer peripheral portion of a central portion of the first radiation sheet, the first radiation sheet being connected to the printed circuit board,
   wherein the NFC antenna module is bent at a portion between the printed circuit board and the first radiation sheet so that the first radiation sheet is disposed on a side surface of the battery pack.

2. The portable terminal of claim 1, the NFC antenna module further comprising:
   a second radiation sheet connected to the printed circuit board that is connected to the first radiation sheet,
   wherein the NFC antenna module is bent at a portion between the printed circuit board and the second radiation sheet so that the second radiation sheet is disposed on another side surface of the battery pack.

3. The portable terminal of claim 2, wherein the second radiation sheet includes:
   a terminal connected to an internal circuit of the portable terminal; and
   a second radiation pattern connected to the terminal at an end part thereof.

* * * * *